United States Patent Office 3,490,307
Patented Jan. 20, 1970

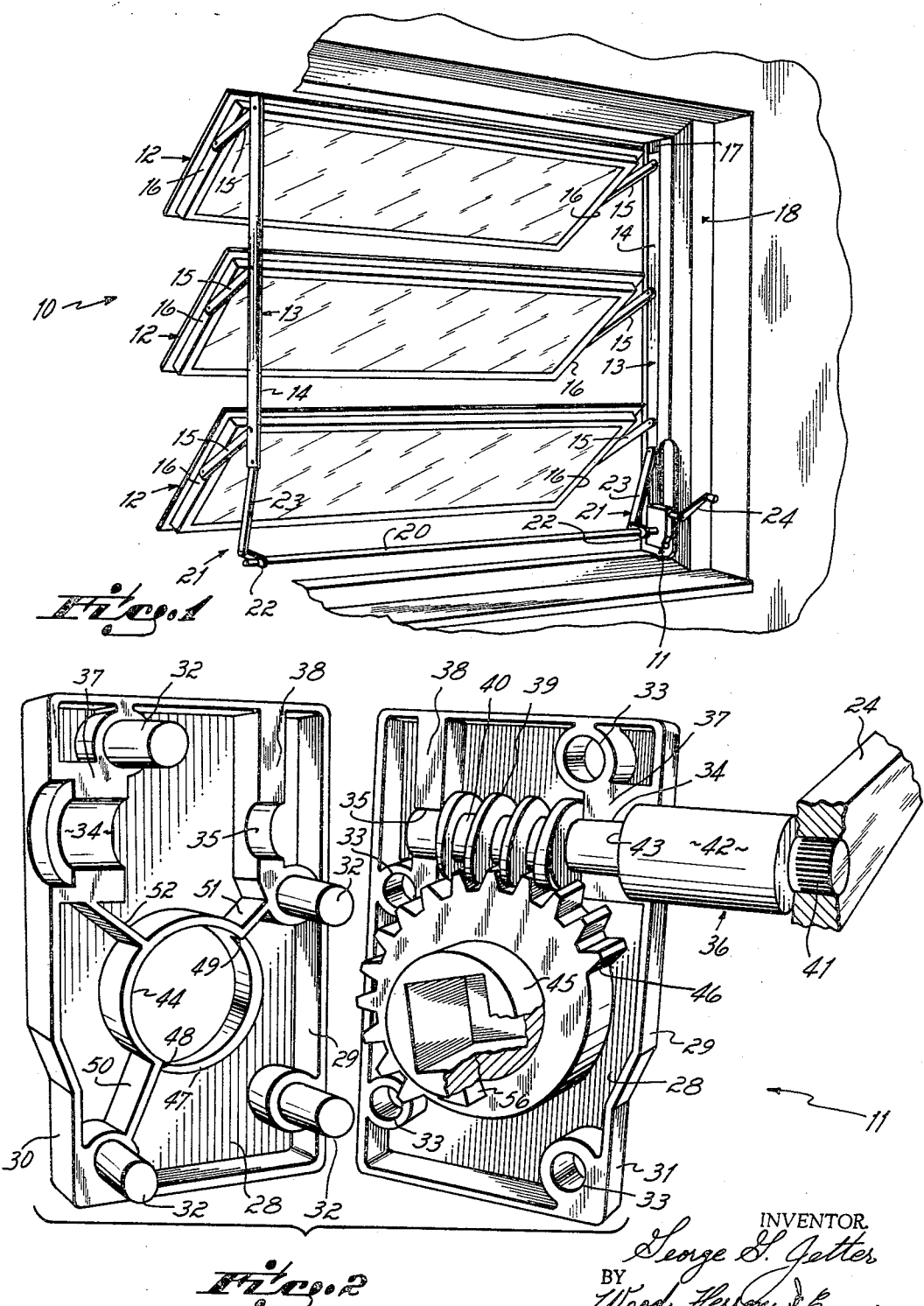

3,490,307
WINDOW OPERATOR
George G. Jetter, Fort Recovery, Ohio, assignor to Fort Recovery Industries, Inc., Fort Recovery, Ohio, a corporation of Ohio
Filed July 25, 1968, Ser. No. 747,566
Int. Cl. F16h *1/12*
U.S. Cl. 74—425                       6 Claims

ABSTRACT OF THE DISCLOSURE

A geared operator for opening and closing a pivotally supported window. The operator comprises a pair of similar housing parts which, when secured together, house and journal a worm gear assembly.

---

This invention relates to pivotally mounted windows and more particularly, to a geared operator for pivotally opening and closing windows in response to rotation of a manually operated handle or crank.

Geared window operators are now commonly used to actuate pivotally mounted windows and particularly, louvered style windows. This style of window is popular in house trailers and campers, items which are now mass produced on production lines and accordingly, geared operators for opening these windows have recently become mass production items. To keep the cost of manufacture down, these operators generally consist of a pair of similar die cast housing parts, one of which has dowel pins die cast into it and the other of which has mating apertures die cast in it. When the two halves are assembled, the ends of the dowel pins are flattened and serve as rivets in the completed assembly.

The gears used in these window operators are also usually die cast or stamped from plate steel and comprise a worm gear segment and a worm wheel, the axes of the gear and wheel being located in perpendicular planes. The end teeth on the segmented gear are usually used as stops engageable with abutments formed on the inside of the housing to limit rotation of the gear.

The primary advantage of window operators of the type described hereinabove, is the minimal cost involved in their manufacture. This low cost is primarily attributable to the omission of machined parts but contributes a distinct disadvantage in that the stamped or die cast gear teeth are never as smooth acting and friction free as machined gear teeth. Consequently, these operators are often subject to jamming and difficult operation.

It has therefore been a primary objective of this invention to provide an inexpensive window operator which is easy to operate and is not subject to jamming, or rough operation.

Applicant has found that when the gear teeth are machined onto segmented gear blanks rather than being die cast or stamped thereon, the resulting operator functions much more smoothly than operators which utilize gears having die cast or stamped teeth. However, these machined gear blank segments often end in partial gear teeth unless during machining the gear blanks are very precisely located relative to the hobber or gear tooth cutter. These partial teeth are undesirable and are subject to breakage or bending when used as stops to limit gear rotation. However, by locating the stops elsewhere on the gear blank, other than on the gear teeth, the need to avoid partial gear teeth is eliminated and care need not be exercised to insure that the gear teeth are full at both ends of the segmented gear. Consequently, the production cost of machining these parts is minimized.

The gear operator of this invention which accomplishes this objective comprises a pair of similar housing parts which are secured together by rivet studs. The studs are fixed to one of the halves of the housing and project into cooperating apertures of the other half. Suitable bearing surfaces or recesses are provided on the interior of each housing half so that when the halves are secured together, they journal or rotatably support the shafts of a segmented worm gear and a worm wheel assembly. Thus, the worm wheel is maintained in proper meshed relationship with the worm gear. The segmented worm gear support shaft has a radially projecting lug, disposed axially from the gear teeth, which cooperates with a pair of stops located on bosses formed on the interior of the housing to limit rotational movement of the segmented gear.

A primary advantage of this construction is that it is easy to operate or manipulate, and involves only a minimal cost in its manufacture.

These and other objects and advantages of this invention will become more apparent when considered in conjunction with the following detailed description of the drawings in which:

FIGURE 1 is a perspective view of a window which incorporates the window operator of this invention; and FIGURE 2 is a partially disassembled perspective view of the window operator of FIGURE 1.

Referring first to FIGURE 1, there is illustrated a conventional louver style window 10 of the type which is opened upon rotation of a crank 24. This window 10 includes a plurality of framed glass louvers 12 interconnected by actuating assemblies 13—13 which control opening and closing of the louvers.

Each actuating assembly 13 comprises a vertically movable actuator bar 14 and a plurality of pivotally mounted torque bars 15. Each torque bar 15 is pivotally connected at one end to a side wall 16 of a louver 12 and at the opposite end to one of the vertical actuator bars 14. The vertical acuator bars 14 are slidable within stationary vertical slideways 17 of the window frame 18. Their movement is controlled by rotational movement of a transverse connecting rod 20 acting upon the vertical bars 14 through a pair of actuating assembles 21—21 located at each end of the rod. Each of these assemblies 21 comprises a pair of links 22, 23, one 22 of which is keyed to the rod 20 and the other 23 of which is pivotally connected at one end to the first link and at the opposite end to the lower end of one of the vertical slide bars 14. When the two links 22, 23 of each operating assembly are extended into longitudinal alignment as a result of rotational movement of the connecting rod 20, the slide bars 14—14 are raised so as to effect closing of the windows. Lowering of the slide bars upon rotation of the connecting rod 20 as a consequence of rotation of the crank 24 causes the louvers to be opened as illustrated in FIGURE 1.

Referring now to FIGURE 2 it will be seen that the operator 11 which imparts rotational movement to the transverse connecting rod 20 upon rotation of the crank 24 comprises two halves of a die cast housing 30, 31. Each half 30, 31 comprises a generally rectangularly shaped side wall 28, and an inwardly extending peripheral wall 29 completely surrounding the side wall. One half 30 is provided with a plurality of rivet pins or studs 32 which, when the halves are assembled, are received in mating apertures 33 in the other half 31. The ends of the pins or studs 32 then are upset so that the studs act as rivets to join the halves of the housing in a unitary assembly.

Each housing part 30, 31 is provided with bosses 37, 38 having coextensive bearing surfaces 34, 35 formed thereon. When the halves of the housing are joined, these bearing surfaces 34, 35 support and rotatably journal a shaft 36. A worm wheel 39 is formed upon the inner end 40 of this shaft 36 and a splined keyway 41 is formed on the opposite or outer end. The crank 24 is drivingly mounted over the splined section of this shaft 36.

An annular groove or recess 43 is formed on the shaft 36 intermediate the ends. Bosses 34—34 of the two housing halves 30, 31 are receivable within this groove 43 to secure the shaft 36 against axial movement.

Each housing half 30, 31 is provided with an internally flanged annular aperture 44—44, adapted to receive and rotatably journal a hub 45 of a die cast worm wheel segment 46. An arcuate recess 47 in one of the flanged apertures 44 defines end shoulders 48, 49 on one flange 44 which, as explained more fully hereinafter, serve as stop surfaces or abutments to limit rotational movement of the gear segment 46. To reinforce the annular flange 44 on each half of the housing parts 30, 31, three ribs 50, 51, 52 extend radially from the flange 44 to bosses formed on the interior of the housing halves. In the case of that half 30 in which the flange 44 is recessed to provide the stop shoulders 48, 49 to limit rotational movement of the gear segment and segment shaft or hub 45, the ribs 50, 51 form extensions of the shoulders and thus reinforce the shoulders to prevent shoulder or stop breakdown.

The hub 45 of the worm wheel 46 is provided with a radially extending lug or stop 56. This lug 56 is received in the recessed portion 47 of the annular flange 44 so that rotational movement of the segmented worm gear is limited by engagement of the radial lug 56 with the shoulders 48, 49 at the ends of the recess 47.

In operation, the handle 24 is rotated to turn the worm which, in turn, rotates the segmented worm gear 46 to impart rotational movement to the connecting rod 20. The connecting rod 20, in turn effects closing of the louver members through the actuating linkage 21, torque actuating arms 14, and the torque bars 15. When the handle 24 has been rotated to its extreme position and the louver members 12 closed, the lug 56 engages the shoulder 49. Rotation of the handle 24 in the opposite direction rotates the lug 56 on hub 45 until the louvers are completely open and the lug engages the shoulder 48.

Both the shaft 36 having the worm wheel formed thereon and the gear segment 46 together with the attached hub 45 are die cast parts. This forming technique enables the parts to be produced relatively inexpensively. The teeth of the gear segment 46 are, however, machined before the parts are assembled and similarly, the spiral groove of the worm wheels is preferably machined so as to improve the dimensional accuracy of the cast parts and minimize friction between them. The advantage of machining the teeth and spiral groove is that it enables the window operator 24 to be rotated much more easily than would be possible if the teeth were left unmachined.

By positioning the stop 56 on the hub 45 of the gear segment 46 and utilizing shoulders 48, 49 of the annular flange 44 to limit rotation of the gear segment, the end teeth of the gear segment need not terminate in whole teeth since the teeth of the gear are not used as stop elements. Thus, there is no necessity to accurately position the gear blank relative to a hobbing tool or gear cutting tool in order to machine these gear teeth.

While I have described only a single preferrd embodiment of my invention, those persons skilled in the arts to which this invention pertains will appreciate changes which may be made without departing from the spirit of my invention.

Having described my invention, I claim:

1. For use in combination with a window pivotally mounted within a window frame, a window operator for controlling opening and closing of said window within said frame, said operator comprising a pair of generally similar hollow housing parts secured together by rivet studs extending inwardly from one of said parts through aligned apertures of the other of said parts, each of said parts having coaxially aligned worm gear bearing apertures therein, and each of said parts having opposed worm wheel bearing recesses therein, rotational stops in the form of boss formations on the interior of one of said housing parts, a worm gear support shaft journaled within said housing and having its opposite ends supported within said worm gear bearing apertures, a worm gear segment non-rotatably secured to said worm gear support shaft, said gear having gear teeth machined into its peripheral surface, a worm wheel located within said housing and engaged with said worm gear so that rotation of said worm wheel effects rotation of said worm gear, the axis of said worm wheel being normal to the axis of said worm gear, worm wheel supporting means rotatably journaled within said worm wheel bearing recesses, a stop lug extending radially from said worm gear support shaft, said stop lug being axially offset on said shaft from said worm gear segment and engageable with said boss formations on said housing parts to limit rotational movement of said worm gear, and means for interconnecting said worm gear support shaft to said window.

2. The window operator of claim 1 wherein said worm gear support shaft is journaled within annular flanges which extend inwardly from side walls of said housing parts, said rotational stops on the interior of one of said housing parts being in the form of shoulders on a recess formed in the annular flange of one of said housing parts.

3. The window operator of claim 2 which further includes radial flanges extending radially outwardly from said shoulders to peripheral walls of said one housing part for reinforcing said shoulders.

4. A window operator for controlling opening and closing of a pivotally mounted window, said operator comprising a pair of generally similar hollow housing parts secured together by rivet studs extending inwardly from one of said parts through aligned apertures of the other of said parts, each of said parts having coaxially aligned worm gear bearing apertures therein, and each of said parts having opposed worm wheel bearing recesses therein, rotational stops in the form of boss formations on the interior of one of said housing parts, a worm gear support shaft journaled within said housing and having its opposite ends supported within said worm gear bearing apertures, a worm gear segment non-rotatably secured to said worm gear support shaft, said gear having gear teeth formed upon its peripheral surface, a worm wheel located within said housing and engaged with said worm gear so that rotation of said worm wheel effects rotation of said worm gear, the axis of said worm wheel being normal to the axis of said worm gear, worm wheel supporting means rotatably journaled within said worm wheel bearing recesses, a stop lug extending radially from said worm gear support shaft, said stop lug being axially offset on said shaft from said worm gear segment and engageable with said boss formations on said housing parts to limit rotational movement of said worm gear, and means for interconnecting said worm gear support shaft to said window.

5. The window operator of claim 4 wherein said worm gear support shaft is journaled within annular flanges which extend inwardly from side walls of said housing parts, said rotational stops on the interior of one of said housing parts being in the form of shoulders on a recess formed in the annular flange of one of said housing parts.

6. The window operator of claim 5 which further includes radial flanges extending radially outwardly from said shoulders to peripheral walls of said one housing part for reinforcing said shoulders.

References Cited

UNITED STATES PATENTS

| | | | |
|---|---|---|---|
| 2,635,485 | 4/1953 | Gravenstine et al. | 74—425 X |
| 2,949,042 | 8/1960 | Bennett | 74—425 |
| 3,319,482 | 5/1967 | Campbell et al. | 74—425 |

LEONARD H. GERIN, Primary Examiner

U.S. Cl. X.R.

74—10.2, 526